United States Patent

[11] 3,530,930

[72] Inventor Reginald Charles Oldfield, Caterham, England
[21] Appl. No. 754,627
[22] Filed Aug. 22, 1968
[45] Patented Sept. 29, 1970
[73] Assignee By Mesne assignments, to U.S. Philips Corporation, New York, N.Y. a corporation of Delaware
[32] Priority Sept. 15, 1967
[33] Great Britain
[31] 42,097/67

[54] HEAT TRANSFER METHOD AND APPARATUS
12 Claims, 2 Drawing Figs.

[52] U.S. Cl. .......... 165/1, 165/133, 204/298, 219/530
[51] Int. Cl. .......... F28f 13/18
[50] Field of Search .......... 165/2, 48, 133, 204, 117, 118, 148; 219/530, 540; 204/298

[56] References Cited

UNITED STATES PATENTS 3,294,661 12/1966 Maissel .......... 204/298

*Primary Examiner*—Robert A. O'Leary
*Assistant Examiner*—Charles Sukalo
*Attorney*—Frank R. Trifari

ABSTRACT: A device for effecting heat transfer between an active and a passive body under near vacuum conditions via an intermediate heat-transferring layer that contacts both bodies, this layer having characteristics in its liquid state for wetting the active body but not wetting the passive body. The device includes means for selectively moving the bodies into and out of contact, and for heating or cooling one of the bodies for heat-transfer with the other.

INVENTOR

BY REGINALD C. OLDFIELD

AGENT

HEAT TRANSFER METHOD AND APPARATUS

Figure 1:
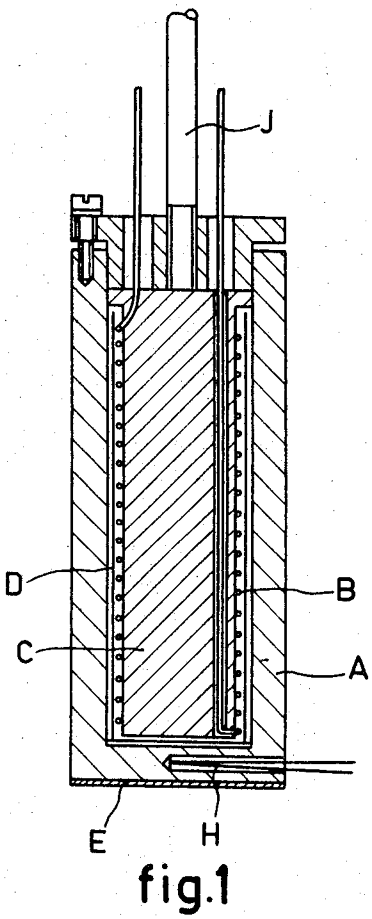

This invention relates to a method of effecting the transfer of heat between an active body and a passive body in a process carried out under near-vacuum conditions. The invention is particularly suitable for use in processes in which a thin film of material is deposited on a substrate by evaporation of the material in an evacuated chamber. In this specification the term "active body" is used to denote a body which is effective to transfer heat to or from another body, which is for convenience referred to as the "passive body".

In thin-film vacuum deposition processes it is customary to heat the substrate by a radiant heater or by an electrically heated metal block placed in contact with the substrate, and subsequently to allow the substrate to cool by radiation. Such methods are wasteful of time and one object of the invention is to enable a substrate to be heated and cooled more rapidly than heretofore.

The present invention provides a method of effecting the transfer of heat between an active body and a passive body in a process carried out under near-vacuum conditions, in which a molten layer of a metal or alloy having a low vapour pressure provides good thermal contact between cooperating surfaces of the two bodies, the said metal or alloy being one which wets the respective surface of the active body but does not wet the cooperating surface of the passive body.

The term "low vapour pressure" means low in relation to the pressure maintained in the particular process at the highest temperature to which the active body is likely to be subjected when in contact with the passive body, so that in operation the metal or alloy will give off no significant quantities of vapour (such as, in a thin-film vacuum deposition process, could give rise to contamination of the deposited film).

The invention is particularly suitable for use in the manufacture of magnetic memory stores, involving a process of depositing a thin film of magnetic material (usually a nickel/iron mixture) on an aluminum substrate (after a suitable surface treatment such as the deposition of a thin layer of, for example, silicon monoxide). For use in such a process, there is a severe limitation in the choice of a suitable metal or alloy to form the said molten layer. For heating purposes, the metal or alloy must have a melting point lower than 300°C. and must have a vapour pressure at that temperature of less than $10^{-8}$ torr. For cooling purposes, the melting point should preferably be of the order of 100°C. or even lower, if possible. The metal or alloy should not chemically attack aluminium to any marked extent (since electrical connections are required to be made to the substrate when the store is in use), nor should it unduly attack the material of the active body over a reasonable period of time. It should also be stable in air at room temperature. Indium, thin and an indium/thin alloy (52 percent In, 48 percent Sn) have been found to be suitable, their melting points being approximately 156°C., 232°C. and 117°C. respectively, and their vapour pressures at 300°C. being less than $10^{-10}$ torr. In practice we prefer to use indium for heating purposes and the indium/tin alloy for cooling purposes, and although in heating devices in which the active body is of copper, the indium tends to diffuse into the copper in use, additional indium can easily be added to the layer from time to time as required. Tin is not so convenient since it appears to diffuse into copper rather more rapidly.

Tests have been made to establish the times taken to heat an aluminium substrate, using heaters of comparable wattage, A, using a radiant heater, B, using an electrically heated copper block in contact with the substrate, and C, using an electrically heated copper block with a thin layer of indium making thermal contact between the block and the substrate. The results, listed below, show the temperatures (°C.) reached by the substrate after specified times (in minutes).

| | Time | | | | | |
|---|---|---|---|---|---|---|
| | 0 | ½ | 1 | 2 | 3 | 4 |
| Temperature (A) | 40 | 57 | 71 | 92 | 108 | 121 |
| Temperature (B) | 40 | 108 | 150 | 207 | 244 | 260 |
| Temperature (C) | 40 | 189 | 226 | 254 | 263 | 266 |

Tests have also been made to establish the times taken for an aluminium substrate to cool from a temperature of 300° C, D, by radiation, E, using a liquid-cooled copper block in contact with the substrate, and F, using a liquid-cooled copper block with a tin layer of 52/48 indium/tin alloy making thermal contact between the block and the substrate. The results, listed below, show the temperatures (°C.) reached by the substrate after specified times (in minutes).

| | Time | | | | | |
|---|---|---|---|---|---|---|
| | 0 | ½ | 1 | 2 | 3 | 4 |
| Temperature (D) | 300 | 295 | 290 | 283 | 277 | 271 |
| Temperature (E) | 300 | 283 | 265 | 235 | 210 | 194 |
| Temperature (F) | 300 | 250 | 205 | 145 | 101 | 75 |

In thin-film vacuum deposition processes, the substrates may both be heated and subsequently cooled by methods according to the invention, using appropriately different types of active-body heating and cooling devices, and it is convenient to limit the cooling time taken for the metal or alloy layer to solidify, the cooling device being then separated from the substrate, which is then further cooled by conventional means, *e.g.* by radiation.

To ensure a convenient continuous process, the heating time and deposition time are adjusted in accordance with the aforementioned cooling time. In practice, it may be convenient to employ several heating devices and a corresponding number of cooling devices in appropriate parts of a suitably evacuated chamber, and to feed several series of substrates through the chamber, each substrate of each series being successively fed to a heating station at which an already heated heating device is caused to engage the substrate for a predetermined time. The substrate is then passed through another part of the chambers, maintained at a substantially constant temperature and in which deposition of the thin film takes place, after which the substrate is passed to a cooling station in a further part of the chamber, where it is engaged by a cooling device. After soldification of the metal or alloy later on the cooling device, the substrate is placed in a convenient rack for further cooling by radiation, successive substrates being stacked above one another, suitably spaced apart. In the manufacture of magnetic memory stores, aluminium substrates are used, which, before being fed to the heating stations, have already been coated with a thin film of material (for example, silicon monoxide, about 3000 A. thick) and provided with suitably apertured masks defining the areas on which deposition of the thin magnetic film is to be effected.

The thickness of the metal or alloy layer on the heating or cooling device does not appear to be particularly critical. It should clearly be sufficiently thick to ensure good thermal contact with the whole of the area of the passive body which it is required to engage. Also, where the heating device is operated in a position in which the layer is at the bottom of the device, the layer should not be so thick that, when molten, the surface tension will not be sufficient to hold the whole of the layer onto the device. In practice, a convenient thickness is of the order of 0.1 to 0.5 mm.

The invention will now be described with reference to the accompanying drawings which illustrate examples of heating and cooling devices suitable for use in carrying out the invention.

Figure 2:
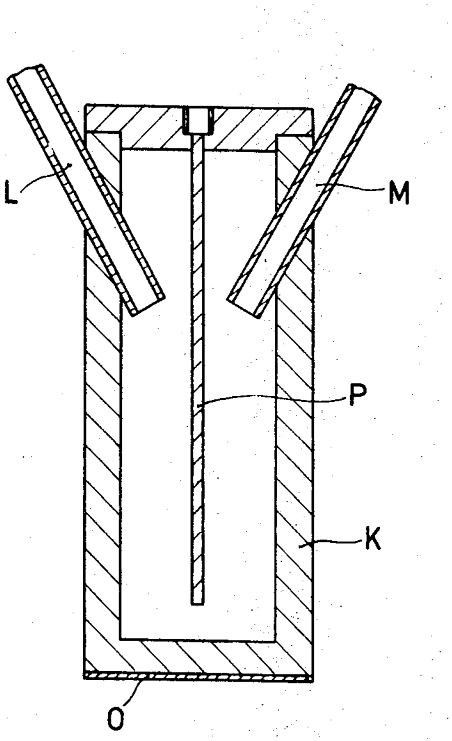

FIG. 1 is a diametrical vertical cross sectional elevation of a heating device and FIG. 2 is a similar view of a cooling device.

Both devices are circular in plan view.

In the heating device of FIG. 1, the body A is of copper and contains an electric heating element B, wound on a former C of insulating material, for example, pyropholite (a high-alumina-content ceramic), and insulated from the copper body A by a layer D of mica. The bottom surface of the body A carries a layer E of indium. The device is provided with temperature-regulating means H in the form of a thermocouple connected to control the operation of the heating element B. The device is also provided with a supporting rod J, by means of which the device may be lowered and raised to bring the indium layer into and out of contact with the cooperating surface of a passive body to be heated (for example, and aluminium substrate used in a thin magnetic film deposition process). The indium wets the copper body, but does not wet aluminium, so it will remain adherent to the heating device and will not adhere to an aluminium substrate. The indium also has a vapour pressure at 300° C, much lower than the pressure existing in the evacuated chamber in which the heating and subsequent deposition takes place, so it will not give off any significant amounts of vapour which could contaminate the deposited film.

In use, the heating device is heated to the required temperature before the indium layer (now molten) is brought into engagement with the co-operating surface of the substrate to be heated, and the substrate is heated more rapidly than would be the case if the indium layer were absent.

In the cooling device of FIG. 2, the body K is of copper, is hollow, and is provided with inlet and outlet openings L and M enabling a cooling liquid, conveniently water, to be pumped through the device. The body K carries a layer O of a 52 percent indium/48 percent tin alloy. A partition P, conveniently of copper, separates the inlet and outlet openings and extends towards the layer-carrying surface, so that most of the cooling liquid will be caused to pass near to that surface. The device is also provided with a supporting rod (not shown), shown by means of which the device may be lowered and raised to bring the alloy layer into and out of contact with the co-operating surface of a passive body to be cooled (for example, a heated aluminium substrate having a freshly deposited thin magnetic film, in a thin film deposition process). As with indium, the alloy wets copper but does not wet aluminium and has an appropriately low vapour pressure, but has a lower melting point.

In use, the alloy layer is brought into engagement with the co-operating surface of the substrate to be cooled. The layer melts and provides good thermal contact between the copper body K and the substrate, which is cooled more rapidly than would be the case if the alloy layer were absent. In a continuous process, the cooling device and substrate are preferably separated when, or soon after, the alloy layer solidifies, and the substrates are then conveniently stacked (as mentioned earlier) to allow further cooling by radiation. For use in a thin magnetic film deposition process, in which the coated substrates are to be cooled in a uniform magnetic field, the cooling device should not contain any magnetic material.

As an example of relative dimensions, for use in heating and cooling aluminium substrates of approximate dimensions 10 cms x 5 cms x 0.5 cm, in a thin magnetic film deposition process, the heating and cooling devices may be 4 cms in diameter and 10 cms in height, the indium or alloy layer may be about 0.2 mm thick, and the electric heating element B may have a consumption of about 50 to 100 watts.

I claim:

1. A device for use in affecting heat transfer between an active and a passive body under near-vacuum conditions, comprising:

a. an active body;

b. means for affecting initial heat transfer in said active body;

c. a layer of principal heat transferring material, the layer being disposed on a surface of said active body and maintainable in a liquid state for contact and heat transfer with said passive body, said layer 1. having a vapor pressure low with respect to said conditions, and
2. having the characteristic in its liquid state of wetting said active body and adhering thereto without wetting said passive body upon contact therewith; and d. means for selectively moving the active body relative to the passive body to bring the latter into and out of contact with said liquid heat-transferring layer for providing heat exchange between said layer and the passive body during said contact.

2. A device as defined in claim 1 for transferring heat from the active body to the passive body, wherein said means comprises heating means for heating said active body, and said layer is heatable to a molten state by said active body for providing good thermal contact between the cooperating surfaces of said bodies.

3. A divice as defined in claim 1 wherein said active body is generally cylindrical, said means is an electrically energized heating coil within the cylinder, and the device further comprises temperature-regulating means to control said heating coil, and support means for moving said bodies into and out of thermal contact.

4. A device as defined in claim 1 wherein said layer comprises a metal or metal alloy.

5. A device as defined in claim 1 wherein said layer is formed of indium.

6. A device as defined in claim 1 for transferring heat from said passive body to said active body, wherein said means comprises cooling means for cooling said active body, said means including an internal passage through which a cooling fluid is flowable.

7. A device as defined in claim 1 wherein said layer is formed of 52 percent indium and 48 percent tin alloy.

8. A device as defined in claim 1 wherein said passive body is an aluminum substrate on which a thin magnetic film is deposited after the substrate is heated.

9. A device as defined in claim 1 for use in a substantially uniform magnetic field, wherein said active body is substantially non-magnetic in composition.

10. A method of effecting heat transfer between an active body and a passive body under near-vacuum conditions, comprising the steps:

a. disposing on a surface of said active body a layer of material having low vapor pressure relative to said conditions and having the characteristic when liquid of wetting said active body, but not wetting the inactive body on contact therewith, b. bringing said layer carried by the active body into contact with the passive body; and c. effecting heat transfer in said active body and thereby effecting corresponding heat transfer between said active and passive bodies through their contacting surfaces.

11. A method as defined in claim 10 wherein effecting heat transfer in the active body comprises heating said body.

12. A method as defined in claim 10 wherein effecting heat transfer in the active body comprises cooling said body.